(12) United States Patent
Yoo et al.

(10) Patent No.: US 12,718,014 B2
(45) Date of Patent: Aug. 25, 2026

(54) METHOD, USER TERMINAL, AND SERVER FOR RECOMMENDING EMOTICONS BASED ON USER'S EMOTICON PREFERENCE INFORMATION

(71) Applicant: KAKAO CORP., Jeju-si (KR)

(72) Inventors: Song Yoo, Seongnam-si (KR); Ji Yeong Kim, Seongnam-si (KR); Hyeon Seon Cho, Seongnam-si (KR); Jee Min Yang, Seongnam-si (KR); Yang Kyun Park, Seongnam-si (KR); Hye Gyeong Jang, Seongnam-si (KR); Hyeon U Ji, Seongnam-si (KR); Heung Soo Kim, Seongnam-si (KR); Jin Sil Park, Seongnam-si (KR); Jeong Min Yoon, Seongnam-si (KR); Hyo Joo Kim, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 308 days.

(21) Appl. No.: 18/470,767

(22) Filed: Sep. 20, 2023

(65) Prior Publication Data

US 2024/0220721 A1 Jul. 4, 2024

(30) Foreign Application Priority Data

Dec. 29, 2022 (KR) ........................ 10-2022-0188487

(51) Int. Cl.
*G06F 40/279* (2020.01)
*G06F 3/023* (2006.01)
(Continued)

(52) U.S. Cl.
CPC .......... *G06F 40/279* (2020.01); *G06F 3/0237* (2013.01); *G06F 3/04886* (2013.01); *G06F 40/274* (2020.01); *G06F 40/30* (2020.01)

(58) Field of Classification Search
CPC ....... G06F 40/274; G06F 3/0237; H04L 51/04
See application file for complete search history.

(56) References Cited

U.S. PATENT DOCUMENTS 8,909,513 B2 * 12/2014 Leydon .................. G06F 40/20 704/5
9,043,196 B1 * 5/2015 Leydon ................ G06F 40/289 704/4

(Continued)

FOREIGN PATENT DOCUMENTS

JP 2016-157468 A 9/2016
JP 2022-506910 A 1/2022

(Continued)

*Primary Examiner* — Benjamin Smith
(74) *Attorney, Agent, or Firm* — Knobbe, Martens, Olson & Bear, LLP

(57) ABSTRACT

A method for recommending emoticons based on emoticon preference information of a user is proposed. The method may include acquiring information on at least one preferred emoticon, wherein the at least one preferred emoticon is designated through an interaction with the user's emoticon according to a predefined method. The method may also include acquiring information on a matching text, wherein the matching text corresponds to at least one matching keyword. The method may further include displaying at least one recommended emoticon corresponding to the at least one matching keyword among the at least one preferred emoticon.

12 Claims, 8 Drawing Sheets

(51) Int. Cl.

| | |
|---|---|
| ***G06F 3/04886*** | (2022.01) |
| ***G06F 40/274*** | (2020.01) |
| ***G06F 40/30*** | (2020.01) |

(56) References Cited

U.S. PATENT DOCUMENTS

| | | | | |
|---|---|---|---|---|
| 9,372,608 | B2 * | 6/2016 | Leydon | G06F 3/04842 |
| 9,515,968 | B2 * | 12/2016 | Ebersman | H04L 51/04 |
| 9,626,152 | B2 * | 4/2017 | Kim | G06F 3/167 |
| 9,705,908 | B1 * | 7/2017 | Thakurta | G06F 21/6254 |
| 9,712,550 | B1 * | 7/2017 | Thakurta | H04L 63/1425 |
| 9,740,677 | B2 * | 8/2017 | Kim | G06F 40/20 |
| 9,792,909 | B2 * | 10/2017 | Kim | G10L 15/26 |
| 10,009,352 | B2 * | 6/2018 | Ebersman | H04L 63/102 |
| 10,013,601 | B2 * | 7/2018 | Ebersman | G06F 3/0482 |
| 10,050,926 | B2 * | 8/2018 | Ebersman | G06F 3/04817 |
| 10,216,722 | B2 * | 2/2019 | Patel | H04L 51/063 |
| 10,254,917 | B2 * | 4/2019 | Leydon | G06F 3/0482 |
| 10,311,144 | B2 * | 6/2019 | Bellegarda | G06F 40/30 |
| 10,318,109 | B2 * | 6/2019 | Desjardins | G06F 40/274 |
| 10,423,240 | B2 * | 9/2019 | Ryu | G06F 3/0237 |
| 10,546,061 | B2 * | 1/2020 | Primavesi | G06F 40/274 |
| 10,547,574 | B2 * | 1/2020 | Pham | H04L 51/02 |
| 10,579,717 | B2 * | 3/2020 | Leydon | G07F 17/3244 |
| 10,606,477 | B1 * | 3/2020 | Donnici | G06F 40/274 |
| 10,754,441 | B2 * | 8/2020 | Montaldi | G06F 3/0237 |
| 10,788,900 | B1 * | 9/2020 | Brendel | G06F 40/53 |
| 10,824,669 | B2 * | 11/2020 | Wan | H04L 51/10 |
| 10,949,000 | B2 * | 3/2021 | Liu | G06N 3/08 |
| 11,044,218 | B1 * | 6/2021 | Eng | H04L 51/10 |
| 11,093,854 | B2 * | 8/2021 | Gao | G06N 7/01 |
| 11,115,356 | B2 * | 9/2021 | Rai | H04L 51/046 |
| 11,115,463 | B2 * | 9/2021 | Cudworth | H04L 51/02 |
| 11,128,582 | B2 * | 9/2021 | Chen | H04L 51/52 |
| 11,138,386 | B2 * | 10/2021 | Chen | H04L 51/02 |
| 11,140,099 | B2 * | 10/2021 | Jina | G06F 16/3329 |
| 11,567,631 | B2 * | 1/2023 | Cha | G06F 3/04817 |
| 11,765,115 | B2 * | 9/2023 | Liu | G06F 3/011 709/204 |
| 11,842,163 | B2 * | 12/2023 | Hu | G06V 30/148 |
| 11,888,791 | B2 * | 1/2024 | Jina | H04L 67/306 |
| 11,991,127 | B2 * | 5/2024 | Dalonzo | G06Q 10/107 |
| 12,106,410 | B2 * | 10/2024 | Wang | G06F 16/538 |
| 12,149,489 | B2 * | 11/2024 | Golobokov | H04L 51/10 |
| 12,182,342 | B2 * | 12/2024 | Yang | G06F 3/04886 |
| 12,223,121 | B2 * | 2/2025 | Prasad | G06F 3/0237 |
| 12,248,640 | B2 * | 3/2025 | Prasad | G06F 3/04886 |
| 12,299,027 | B2 * | 5/2025 | Alston | G06F 16/438 |
| 2013/0159919 | A1 * | 6/2013 | Leydon | G06F 3/04886 715/780 |
| 2013/0249832 | A1 * | 9/2013 | Nakamura | G06F 3/0236 345/173 |
| 2014/0214409 | A1 * | 7/2014 | Leydon | G06F 40/40 704/9 |
| 2015/0100537 | A1 * | 4/2015 | Grieves | G06N 5/02 706/52 |
| 2015/0220774 | A1 * | 8/2015 | Ebersman | G06F 40/274 382/118 |
| 2015/0222586 | A1 * | 8/2015 | Ebersman | G06F 40/274 715/752 |
| 2016/0004413 | A1 * | 1/2016 | Leydon | G07F 17/3244 715/838 |
| 2016/0110058 | A1 * | 4/2016 | Leydon | G06F 3/0237 715/773 |
| 2016/0210116 | A1 * | 7/2016 | Kim | G06F 40/274 |
| 2016/0210117 | A1 * | 7/2016 | Kim | H04L 51/52 |
| 2016/0210962 | A1 * | 7/2016 | Kim | G06F 40/30 |
| 2016/0283454 | A1 * | 9/2016 | Leydon | G06F 3/0238 |
| 2016/0292148 | A1 * | 10/2016 | Aley | G06F 40/274 |
| 2017/0011303 | A1 * | 1/2017 | Annapureddy | G06F 16/22 |
| 2017/0161238 | A1 * | 6/2017 | Fang | G06F 3/0237 |
| 2017/0185581 | A1 * | 6/2017 | Bojja | G06V 30/19173 |
| 2017/0249017 | A1 * | 8/2017 | Ryu | G06F 3/018 |
| 2017/0249291 | A1 * | 8/2017 | Patel | H04L 51/063 |
| 2017/0270087 | A1 * | 9/2017 | Leydon | G06F 40/226 |
| 2017/0308290 | A1 * | 10/2017 | Patel | G06F 3/04817 |
| 2017/0359363 | A1 * | 12/2017 | Thakurta | G06F 40/242 |
| 2017/0359364 | A1 * | 12/2017 | Thakurta | G06F 40/134 |
| 2018/0052819 | A1 * | 2/2018 | Primavesi | G06F 40/289 |
| 2018/0053101 | A1 * | 2/2018 | Cudworth | H04L 67/10 |
| 2018/0083898 | A1 * | 3/2018 | Pham | H04L 51/046 |
| 2018/0107945 | A1 * | 4/2018 | Gao | G06N 7/01 |
| 2018/0255009 | A1 * | 9/2018 | Chen | G06Q 50/01 |
| 2018/0314343 | A1 * | 11/2018 | Montaldi | G06F 40/274 |
| 2018/0336184 | A1 * | 11/2018 | Bellegarda | G06F 40/30 |
| 2018/0356957 | A1 * | 12/2018 | Desjardins | G06F 40/274 |
| 2018/0373683 | A1 * | 12/2018 | Hullette | H04L 51/04 |
| 2019/0087466 | A1 * | 3/2019 | Wang | G06F 40/123 |
| 2019/0286648 | A1 * | 9/2019 | Wan | G06F 16/51 |
| 2019/0294259 | A1 * | 9/2019 | Liu | H04L 51/10 |
| 2020/0393915 | A1 * | 12/2020 | Brendel | G06F 18/23213 |
| 2021/0141866 | A1 * | 5/2021 | Chen | G06F 40/30 |
| 2021/0152501 | A1 * | 5/2021 | Rai | H04L 51/046 |
| 2021/0385184 | A1 * | 12/2021 | Dalonzo | H04L 51/216 |
| 2022/0004872 | A1 * | 1/2022 | Raja | G06F 16/24578 |
| 2022/0269354 | A1 * | 8/2022 | Prasad | H04L 51/04 |
| 2022/0404952 | A1 * | 12/2022 | Cha | G06F 16/148 |
| 2022/0413625 | A1 * | 12/2022 | Yang | G06F 3/04842 |
| 2023/0035961 | A1 * | 2/2023 | Liu | G06F 3/04886 |
| 2023/0106202 | A1 * | 4/2023 | Hu | G06V 30/148 704/9 |
| 2023/0229245 | A1 * | 7/2023 | Jeon | G06F 3/023 715/773 |
| 2023/0288990 | A1 * | 9/2023 | Prasad | G06F 40/274 |
| 2023/0410394 | A1 * | 12/2023 | Wang | H04L 51/10 |
| 2024/0015120 | A1 * | 1/2024 | Dalonzo | H04L 51/42 |
| 2024/0314091 | A1 * | 9/2024 | Golobokov | G06N 20/00 |
| 2024/0330354 | A1 * | 10/2024 | Alston | G06F 16/438 |
| 2025/0055818 | A1 * | 2/2025 | Golobokov | H04L 51/10 |

FOREIGN PATENT DOCUMENTS

| | | | |
|---|---|---|---|
| JP | 2022-099331 | A | 7/2022 |
| JP | 2022-115813 | A | 8/2022 |
| KR | 10-2013-0123636 | A | 11/2013 |
| KR | 10-2021-0078929 | A | 6/2021 |
| KR | 10-2324200 | B1 | 11/2021 |
| KR | 10-2022-0090304 | A | 6/2022 |

* cited by examiner

FIG. 4

| Specific Type | Level of Involvement | Preferred Emoticons |
|---|---|---|
| First Type (Favorite) | Level 3 | A3, A5, C9, D3, D5, F2, F7, G4 |
| Second Type (shortcut path) | Level 2 | A1, D4<br>Set03[C7, F4, G5, K2], SET05[F5, M5, R3] |
| Third Type (Recently sent) | Level 1 | A2, C6, D2, D5, F3, F6 |

FIG. 5

| Matching text | Sequence Information | Matching Keyword | Recommended Emoticons |
|---|---|---|---|
| Christmas | 1 | Christmas | A3, A5, A1, A2 |
| | 2 | Santa | - |
| | 3 | Cake | C9, C7, C6 |
| | 4 | Tree | D3, D5, D4, D2 |
| | 5 | Carol | - |

FIG. 8

| Matching text | Sequence Information | Matching Keyword | Recommended Emoticons | Extended Emoticons |
|---|---|---|---|---|
| Christmas | 1 | Christmas (A) | A3, A5, A1, A2 | EA1, EA3, EA7, EA8, EA9 |
| | 2 | Santa (B) | - | - |
| | 3 | Cake (C) | C9, C7, C6 | EC4, EC6, EC7, EC8 |
| | 4 | Tree (D) | D3, D5, D4, D2 | ED3, ED4, ED8. ED9 |

METHOD, USER TERMINAL, AND SERVER FOR RECOMMENDING EMOTICONS BASED ON USER'S EMOTICON PREFERENCE INFORMATION

CROSS-REFERENCE TO RELATED APPLICATION

This application claims priority to and the benefit of Korean Patent Application No. 10-2022-0188487 filed on Dec. 29, 2022, the disclosure of which is incorporated herein by reference in its entirety.

BACKGROUND

Technical Field

The present disclosure relates to a method for recommending emoticons based on a user's emoticon preference information.

Description the Related Technology

With the advancement of wireless communication, various social media services are widely available. Users utilize these social media services to engage in conversations and express their thoughts actively. In addition, the users can exchange messages with others, including friends, through messenger services. The exchanged messages encompass various types such as text, images, videos, and emoticons. In particular, emoticons serve as an effective means of expressing users' emotions and intentions during conversations, and numerous services provide messenger platforms enriched with a variety of these emoticons.

SUMMARY

One aspect is to identify recommended emoticons according to a predefined method for a user's emoticons, allowing the user to conveniently select preferred emoticons.

Another aspect is to provide users with appropriate recommended emoticons based on matching keywords.

Another aspect is a method for recommending emoticons based on emoticon preference information of a user, that includes: acquiring information on at least one preferred emoticon, wherein the at least one preferred emoticon is designated through an interaction with the user's emoticon according to a predefined method; acquiring information on a matching text, wherein the matching text corresponds to at least one matching keyword; and displaying at least one recommended emoticon corresponding to the at least one matching keyword among the at least one preferred emoticon.

The at least one preferred emoticon may be categorized into at least one specific type. The at least one specific type may include: a first type designated as a favorite by the user; a second type for which a shortcut path is created by the user; and a third type designated as a recently sent item by the user.

The at least one preferred emoticon may be categorized into one or more specific type. In the displaying of the at least one recommended emoticon, a position of the at least one recommended emoticon may be determined based on the at least one specific type.

Each of the at least one matching keyword may correspond to distinct sequence information. In the displaying of the at least one recommended emoticon, a position of the at least one recommended emoticon may be determined based on the sequence information of the at least one corresponding matching keyword.

Each of the at least one matching keyword may correspond to sequence information different from sequence information of other matching keywords. The at least one preferred emoticon may be categorized into at least one specific type. In the displaying of the at least one recommended emoticon, a primary position of at least one recommended emoticon may be determined based on the sequence information of the at least one corresponding matching keyword, and a secondary position of the at least one recommended emoticon within the primary position may be determined based on the at least one specific type.

The method may further include determining whether a number of the at least one recommended emoticon satisfies a predetermined first quantity condition. The displaying of the at least one recommended emoticon may be performed only when the number of recommended emoticons satisfies the first quantity condition.

The method may further include, prior to the displaying of the at least one recommended emoticon, displaying an interface associated with an emoticon recommendation based on the preference information and receiving an interaction with the interface.

The receiving of an interaction with the interface may be performed only when a number of the at least one recommended emoticon satisfies a predetermined first quantity condition.

In the displaying of the at least one recommended emoticon, at least one extended emoticon having same characteristic information as characteristic information associated with a character of the at least one recommended emoticon may be further displayed.

The at least one recommended emoticon may be displayed with a higher priority than the at least one extended emoticon.

A position of the at least one extended emoticon may be determined based on release date information.

Whether to display the at least one extended emoticon may be determined depending on whether a number of the at least one recommended emoticon satisfies a predetermined second quantity condition.

The method may further include displaying a matching keyword corresponding to the at least one recommended emoticon, among the at least one matching keyword, in a manner distinct from other matching keywords.

Another aspect is a user terminal for recommending emoticons based on a user's emoticon preference information, that includes: a memory; and a processor connected to the memory and configured to execute instructions stored in the memory. The processor is further configured to: acquire information on at least one preferred emoticon, wherein the preferred emoticon is designated through the user's interaction with the emoticon according to a predefined method; acquire information on a matching text, wherein the matching text corresponds at least one matching keyword; and display at least one recommended emoticon corresponding to the at least one matching keyword among the at least one preferred emoticon.

Another aspect is a method in which a server recommends emoticons based on a user's emoticon preference information, that includes: acquire information on at least one preferred emoticon of the user from a user terminal, wherein the at least one preferred emoticon is designated by the user's interaction with the emoticon according to a predefined method; acquire information on a matching text from the user terminal, wherein the matching text corresponds to at least one matching keyword; and provide the user terminal with information on at least one recommended emoticon corresponding to the at least one matching keyword among the at least one preferred emoticon.

The method may further include: identifying at least one extended emoticon having same characteristic information as characteristic information associated with a character of the at least one recommended emoticon; and providing the user terminal with information on the at least one extended emoticon.

Another aspect is a server for recommending emoticons based on a user's emoticon preference information, that includes: a memory; and a processor connected to the memory and configured to execute instructions stored in the memory. The processor is further configured to: acquire information on at least one preferred emoticon of the user from a user terminal, wherein the preferred emoticon is designated by the user's interaction with the emoticon according to a predefined method; acquire information on a matching text from the user terminal, wherein the matching text corresponds to at least one matching keyword; and provide the user terminal with information on at least one recommended emoticon corresponding to the at least one matching keyword among the at least one preferred emoticon.

BRIEF DESCRIPTION OF THE DRAWINGS

FIG. 4 is a table illustrating preferred emoticons in a method for recommending emoticons based on a user's emoticon preference information according to the present disclosure.

FIG. 5 is a table illustrating matching keywords and corresponding recommended emoticons in a method for recommending emoticons based on a user's emoticon preference information according to the present disclosure.

FIG. 8 is a table illustrating recommended and extended emoticons in a method for recommending emoticons based on a user's emoticon preference information according to an embodiment of the present disclosure.

DETAILED DESCRIPTION

As the frequency of emoticon usage and the variety of emoticon types increase, users are increasingly demanding recommendations for appropriate emoticons that match their intentions and situations. However, implementing a method to recommend emoticons that cater to the diverse needs of various users is highly challenging. Consequently, there is a growing need for a method for enabling users to receive emoticon recommendations taking into account their preferences, situations, and other relevant factors.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

In this application, steps described may be performed regardless of a listed order, except for a case where they must be performed in the listed order due to a special causal relationship.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described with reference to the accompanying drawings.

Figure 1:
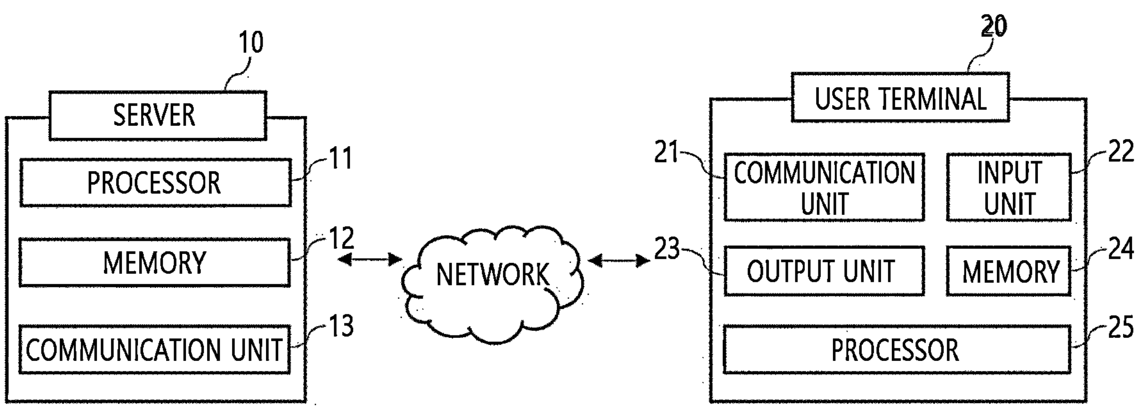
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10 and a user terminal 20.

The server 10 is an apparatus that provides a messenger service to the user terminal 20. The user terminal 20 is an apparatus using the messenger service provided by the server 10.

The messenger service may be a service through which a plurality of users sends or receives messages to each other via a platform provided by the server 10. Here, the message may be understood to encompass transferable data such as texts, photos, videos, audio files, emoticons, and the like.

Here, the emoticons may refer to image objects transmitted through the chat rooms of messenger services. These emoticons may be referred to interchangeably as images, emojis, stickers, and similar terms, and may be replaced with different types of content, beyond just text.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The server 10 may be implemented as a computer device or a plurality of computer devices that provide commands, codes, files, contents, services, and the like. The server 10 may be a server 10 capable of transmitting and receiving information through communication with a user terminal via a network.

The server 10 may include a processor 11, a memory 12, and a communication unit 13.

The processor 11 may provide a messenger service to the user terminal by controlling overall operations of the memory 12 and the communication unit 13.

The memory 12 serves as a storage medium and may store a plurality of application programs running on the server 10, and data and instructions for operating the server 10. In one embodiment, an application associated with a messenger service may be stored in the memory 12. The memory 12 may be provided in the form of any of various hardware storage devices such as an ROM, an RAM, a flash drive, a hard drive, etc. or may be provided in the form of web storage.

The communication unit 13 may communicate with the user terminal via a network in a wired or wireless manner.

The server 10 of the present disclosure recommends emoticons based on a user's emoticon preference information. Specifically, the server 10 acquires information on at least one preferred emoticon of the user from the user terminal 20. A preferred emoticon is designated by the user's interaction with the emoticon according to a predefined method. Thereafter, the server 10 acquires information on a matching text from the user terminal 20. The matching text corresponds to at least one matching keyword. The server 10 provides the user terminal 20 with information on at least one recommended emoticon corresponding to the matching keyword among preferred emoticons.

Here, the emoticon preference information may be information generated by the user's various interactions through which the user can engage with emoticons. The emoticon preference information may be defined in different forms through various user interfaces in a service environment where emoticons are used.

The emoticon preference information may include, for example, include at least one of the following: information on a user designating an emoticon as a separate preferred emoticon (bookmark), information on the user purchasing an emoticon, information on the user's subscribing to a service that allow the user to use emoticons over a predetermined period (through periodic payments), information on the user assigning a separate preference marker (such as "like," "heart," and others), information on the user saving an emoticon to the user terminal 20, information on the user creating a shortcut path for using an emoticon, information on the user gifting emoticons to other users or receiving emoticons as gifts from other users, and information on the number of times or frequency for usage of an emoticon by the user. Here, the number of times or frequency for usage of an emoticon may be calculated based on a predetermined period such as the last 30 days. The emoticon preference information is not limited to the above examples but may be variously expanded or modified.

Here, a preferred emoticon refers to an emoticon or at least one emoticon set (group) that satisfies a predetermined preference criterion based on emoticon preference information Even if an emoticon is associated with the emoticon preference information, the emoticon may not be designated as a preferred emoticon when failing to satisfy the predetermined preference criterion. For example, even if an emoticon is stored in the user terminal 20 by the user, the emoticon may not be designated as a preferred emoticon if the user later deletes the emoticon or deletes a shortcut path to the emoticon. In addition, even if an emoticon has been previously used by the user, the emoticon may not be designated as a preferred emoticon if the emoticon has not been used within a predetermined recent period or if the emotion has not been used less than a predetermined number of times.

Here, a matching text refers to text information used to search for or recommend emoticons. The server 10 or the user terminal 20 of the present disclosure may store a keyword dictionary including matching texts directly or indirectly matched with emoticons. Using the matching texts stored in the keyword dictionary, the user may search for or receive recommendations for emoticons matched with the matching texts.

The user may input a matching text through the user terminal 20 or select one of at least one matching text to search for or receive recommendations for emoticons. In some cases, if text information received or displayed corresponds to a matching text included in the keyword dictionary, the user terminal 20 may display a distinct indicator for the text information, indicating to the user that it is possible to search for or receive recommendations for emoticons based on the text information.

Here, the matching keyword is information corresponding to a matching text. At least one matching keyword may correspond to one matching text. A matching keyword may be matched with an emoticon. At least one matching keyword may correspond to one emoticon. Such a matching keyword may be included in the keyword dictionary.

Thus, when the user inputs information on a matching text to the user terminal 20, the user terminal 20 or the server 10 may refer to the keyword dictionary to identify at least one matching keyword corresponding to the matching text. Accordingly, the user terminal 20 or the server 10 may identify at least one emoticon matched with the matching keyword and provide the same to the user.

For example, if the user inputs information on a matching text of "hello" to the user terminal 20, the user terminal 20 or the server 10 may refer to the keyword dictionary to identify "hello," "hi" and "greetings" corresponding to the matching text of "hello." Accordingly, the user terminal 20 or the server 10 may provide the user with emoticons matched with each matching keyword.

In some cases, it is also possible to use the matching keyword and matching text interchangeably without differentiation. This may be understood as cases where there is a one-to-one correspondence between the matching text and the matching keyword and the matching text is identical to the matching keyword. The above example may be a case where the matching text is "hello" and there is only one keyword "hello" corresponding to the matching keyword.

The user terminal 20 is an apparatus that uses the messenger service provided by the server 10 and receives emoticon recommendations in the messenger service. The user terminal 20 may include a communication unit 21, an input unit 22, an output unit 23, a memory 24, and a processor 25.

The communication unit 21 may communicate with the server 10 or other terminals in a wired/wireless manner.

The input unit 22 may receive various types of information through a user's manipulation and input behavior. Such an input unit may be a touch screen module, a keyboard, a mouse, a button, a camera, a stylus, and a microphone.

The user terminal 20 may receive a user's interaction through the input unit 22. The interaction refers to a process where a user manipulate the input unit 22 to input information reflecting his or her choices or intentions into the user terminal 20. For example, the interaction may include touching on a touchscreen, clicking with a mouse, typing on a keyboard, providing voice input through a microphone, capturing an image using a camera, recognizing movements through a motion sensor, and the like.

The output unit 23 may output various types of information. The output unit 23 may be a display device, a speaker, a vibration generating device, a tactile sensation generating device, and the like. In some cases, the output unit 23 may be a device (e.g., Bluetooth earphone) that is connected to a user terminal through wired or wireless communication (e.g., short-range radio communication such as Bluetooth) to receive and output a signal.

The memory 24 serves as a storage medium and may store a plurality of application programs running on a user terminal, and data and instructions for operating the first user terminal 20. This memory may be provided in the form of any of various hardware storage devices such as an ROM, an RAM, a flash drive, a hard drive, etc. or may be provided in the form of web storage. In one embodiment, an application associated with a messenger service may be stored in the memory 24.

The processor 25 may execute an application by controlling overall operations of the communication unit 21, the input unit 22, the output unit 23, and the memory 24.

The user terminal 20 of the present disclosure recommends emoticons to the user based on the user's emoticon preference information. Specifically, the user terminal 20 acquires information on at least one preferred emoticon. A preferred emoticon is designated by the user's interaction with the emoticon according to a predefined method. Thereafter, the user terminal 20 acquires information on a matching text. The matching text corresponds to at least one matching keyword. The user terminal 20 displays at least one recommended emoticon corresponding to the matching keyword among preferred emoticons.

Figure 2:
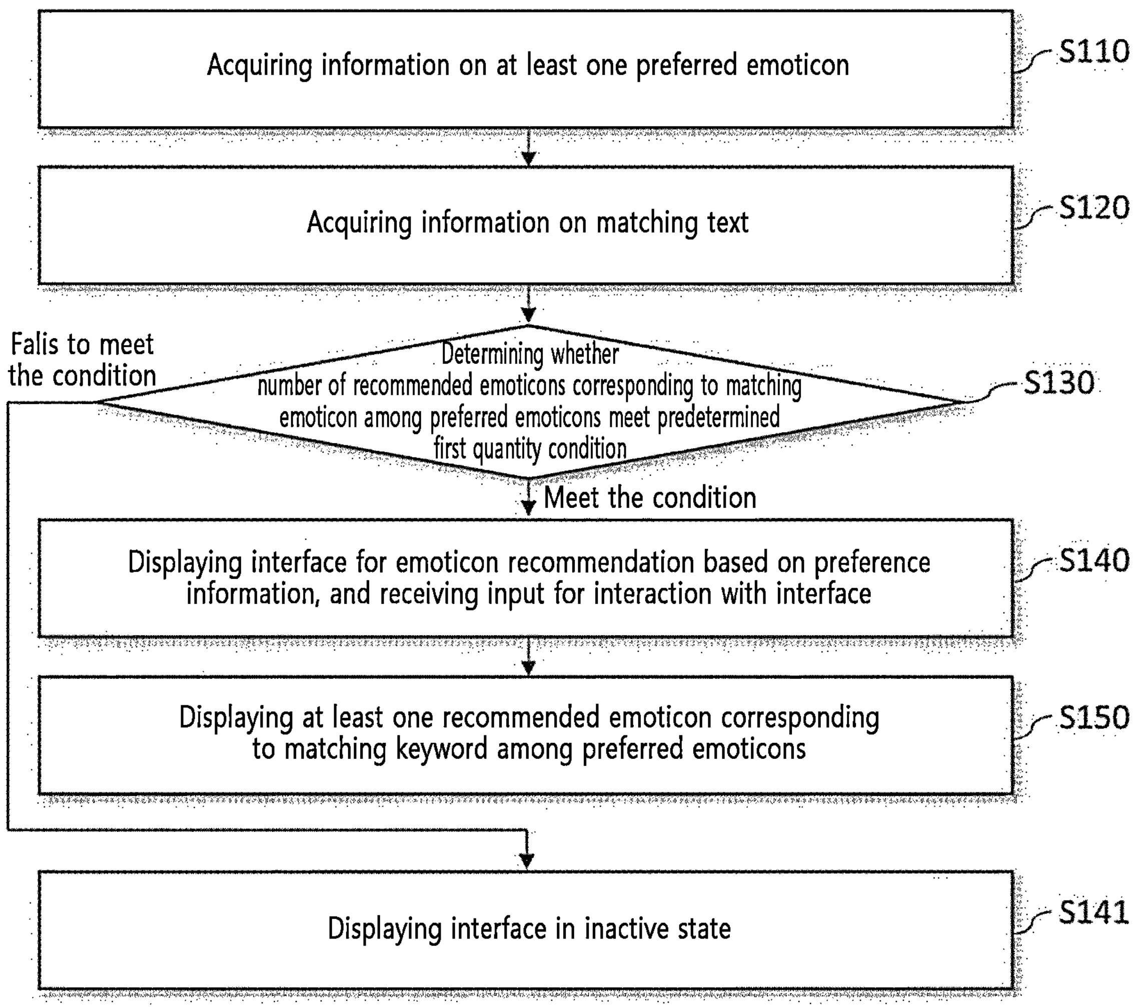
FIG. 2 is a flowchart of the operation of a user terminal according to an embodiment of the present disclosure.

FIG. 2 is a flow chart for the operation of the user terminal 20 according to an embodiment of the present disclosure.

Steps described in the following may be performed regardless of a listed order, except for cases where the steps must be performed in the listed order due to a special causal relationship. However, in the following description, it is assumed that the above-described steps are performed in the listed order for convenience of description.

In operation S110, the user terminal 20 acquires information on at least one preferred emoticon.

Here, a preferred emoticon is designated by a user's interaction with the emoticon according to a predefined method. A specific type of the preferred emoticon may be determined based on the user's interaction of designating the preferred emoticon.

Specifically, the preferred emoticon includes at least one of a first type designated as a favorite by the user, a second type for which a shortcut path is created by the user, and a third type designated as a recently sent item by the user. The description of the above three types is merely an example, and there may be additional types based on various other criterion.

Emoticons designated as preferred emoticons of the first type are displayed through a separate favorites menu on the user terminal 20, allowing the user to conveniently utilize the preferred emoticons of the first type.

A shortcut path for a preferred emoticon of the second type may either directly access the preferred emoticon of the second type itself or access an emoticon set including the preferred emoticon of the second type. A shortcut path for the preferred emoticon may be generated when the user downloads or purchases the corresponding emoticon or emoticon set, or when the user requests the creation of a separate shortcut path for the corresponding emoticon or emoticon set. The shortcut interface may be displayed around a keyboard area displayed on the user terminal 20. By inputting an interaction on the shortcut interface, the user may quickly access and use the preferred emoticon of the second type.

A shortcut path may be generated not only by inputting an interaction to create a shortcut for an individual emoticon or emoticon set corresponding to a preferred emoticon of a second type, but also by an action such as saving the emoticon or emoticon set and exchanging a gift of the emoticon or emoticon set.

A preferred emoticon of the third type may be limited to an emoticon used within a predetermined recent period. In some cases, when the number of emoticons used within the predetermined recent period exceeds a reference value, preferred emoticons of the third type may be designated based on the order of recent usage.

For example, a preferred emoticon of the third type is an emoticon used within the last 30 days, and the reference value may be 700. If a user uses 800 emoticons within the last 30 days, the recently used 700 emoticons may be designated as the preferred emoticons of the third type.

Based on a specific type such as the first, second, and third types, the position of an emoticon may be determined in a process of displaying emoticons in operation S150. How to determine the position of an emoticon based on a specific type will be described in more detail in association with operation S150.

When the user terminal 20 acquires information on a preferred emoticon in operation S110, the user terminal 20 may provide the acquired information to the server 10. The preference information is provided at a predetermined period or in real time, so that the server 10 can maintain information on the user's preferred emoticons in the latest state. The server 10 may store information on preferred emoticons for each user and select recommended emoticons to be displayed in operation S150.

At least one of the preferred emoticons designated in operation S110 corresponds to a matching keyword. The matching keyword may be determined based on the contents of preferred emoticons, themes, and characteristics of characters. It is also possible that a plurality of matching keywords correspond to one preferred emoticon.

In operation S120, the user terminal 20 acquires information on a matching text.

The user may input the matching text into the user terminal 20. Specifically, a user may input the matching text into a conversation input window in a messenger application. In some cases, the user may input the matching text by selecting one matching text from at least one matching text list.

The matching text corresponds to at least one matching keyword. Correspondence between matching texts and matching keywords may be stored in a keyword dictionary stored in the user terminal 20 or the server 10. When the user terminal 20 acquires information on a matching text, the user terminal 20 may identify the matching text by referring to the keyword dictionary for subsequent operations.

In some cases, when the user terminal 20 acquires a matching text, the user terminal 20 may display a hint object indicating that the matching text has been input. The hint object may be displayed to notify the user that a text acquired by the user terminal 20 corresponds to a matching text.

When the user inputs an interaction for the hint object, the user terminal 20 may provide an emoticon recommendation based on the matching text. This hint object may be different from an interface displayed in operation S140 below. Specifically, the hint object may be associated with an emoticon recommendation based on a matching text acquired by the user terminal 20, and the interface displayed in operation S140 may be associated with an emoticon recommendation based on the user's emoticon preference information in addition to the matching text. That is, functionality performed based on an interaction for the hint object may include functionality performed based on an interaction with the interface displayed in operation S140. Accordingly, when an interaction for the hint object is input, information on a method for recommending emoticons based on at least one matching text may be displayed. The method for recommending emoticons based on at least one matching text may include, for example, a method for recommending emoticons corresponding to a matching text and a method of providing at least one matching keyword corresponding to a matching text and recommending emoticons corresponding to the at least one matching keyword. The interface displayed in operation S140 may correspond to one of the aforementioned methods.

However, unlike the above, in some cases, the hint object and the interface displayed in operation S140 may be the same. That is, the hint object may be omitted and only the interface displayed in operation S140 may be shown. In this case, the user may be provided only with emoticon recommendations based on both the matching text and the emoticon preference information. In other words, the user may not be provided with emoticon recommendations based solely on the matching text, regardless of the emoticon preference information.

In operation S130, the user terminal 20 determines whether the number of recommended emoticons satisfies a predetermined first quantity condition.

The recommended emoticons refers to emoticons corresponding to a matching keyword among preferred emoticons acquired in operation S110. In operation S130, the user terminal 20 identifies the number of recommended emoticons to determine whether the predetermined first quantity condition is satisfied.

Here, the predetermined first quantity condition may be one or more. In this case, operation S130 is to determine whether there is any recommended emoticon. However, in some cases, the predetermined first quantity condition may vary.

Operations S140 and S150 are performed only when the number of recommended emoticons satisfies the first quantity condition in operation S130. If the number of recommended emoticons fails to satisfy the first quantity condition, emoticon recommendations based on the preference information are not provided and only emoticon recommendations based on a matching text through another method is provided.

In operation S140, the user terminal 20 displays an interface for emoticon recommendations based on the preference information, and receives an interaction with the interface.

If the number of recommended emoticons fails to satisfy the first quantity condition in operation S130, there is no emoticon to be recommended based on the user's emoticon preference information. In this case, operation S140 may not be performed or the interface may be displayed in an inactive state in operation S141.

After the interface is displayed in operation S140, an interaction with the interface may be received from the user. Here, the user's input to the interface may be interpreted as a request for emoticon recommendations based on the emoticon preference information.

In operation S150, the user terminal 20 displays at least one recommended emoticon corresponding to a matching keyword among the preferred emoticons.

The recommended emoticon may be displayed instead of a keyboard area of the user terminal 20. When the number of recommended emoticons exceeds the capacity to be displayed within a predetermined area, the recommended emoticons may be shown in a scrollable manner, allowing for the display of additional emoticons. Each recommended emoticon is displayed in the form of a selectable interface, so that the user can easily use the recommended emoticon by inputting an interaction for the displayed recommended emoticon.

When there are a plurality of recommended emoticons, the positions of the recommended emoticons may be determined using a predefined method. Since recommended emoticons are displayed according to a predefined arrangement, so the positions of the recommended emoticons may be associated with the order of the arrangement.

First, it will be described how the positions of recommended emoticons are determined based on sequence information of corresponding matching keywords.

The matching text acquired in operation S120 may correspond to at least one matching keyword. Here, at least one matching keyword may correspond to distinct sequence information. The positions of the recommended emoticons may be determined based on sequence information of corresponding matching keywords.

For example, three matching keywords such as "hello", "hi" and "greetings" may correspond to a matching text "hello." In this case, the sequence information of the matching keywords may correspond to "hello" in a first position, "hi" in a second position, and "greeting" in a third position. In this situation, let's assume that the following four emoticons have been identified as recommended emoticons: emoticons A and B (corresponding to the matching keyword "hello"), emoticon C (corresponding to the matching keyword "hi"), and emoticon D (corresponding to the matching keyword "greetings"). Then, among the four emoticons, the emoticons A and B corresponding to a first matching keyword "hello" are displayed first (with a higher priority), the emoticon C corresponding to a second matching keyword "hi" is displayed next, and the emoticon D corresponding to a third matching keyword "greeting" may be displayed at the end (with a lower priority).

Next, it will be described how the positions of recommended emoticons are determined based on specific types for preferred emoticons.

As described above, the preferred emoticons acquired in operation S110 may be categorized into specific types. For example, the preferred emoticons may be categorized into a first type designated as a favorite by a user, a second type for which a shortcut path is created by the user, and a third type designated as a recently sent item by the user.

For the specific types for the preferred emoticons, involvement levels may be categorized by a degree of the user's involvement. A high degree of involvement (involvement level) indicate that an interaction input by the user to designate an emoticon as a preferred emoticon requires a separate action so that the preferred emoticon is separately managed and the user cannot easily delete or change the preferred emoticon.

For example, in order to designate an emoticon as a favorite, the user should input a separate favorite interaction for the emoticon. However, in order for the user to designate an emoticon as a recently used emoticon, it is sufficient to simply use (send) the emoticon and no separate interaction is required. In this case, it can be said that designating a certain emoticon as a favorite involves a higher degree of involvement compared to designating the same as a recently used emoticon.

Specifically, for the aforementioned first, second, and third types, the first type may be determined to have a highest degree of involvement and thus have Level 3; the second type may be determined to have a moderate degree of involvement and thus have Level 2; and the third type may be determined to have a relatively low degree of involvement and thus have Level 1.

Determining the positions of the recommended emoticons depending on the specific types for the preferred emoticons may indicate that the positions of the recommended emoticons are determined according to the involvement levels of the specific types. For example, each specific type may be displayed with a higher priority as an involvement level thereof is higher.

Specifically, a preferred emoticon of the first type corresponding to Level 3 may be displayed first (with a higher priority), a preferred emoticon of the second type corresponding to Level 2 may be displayed next, and a preferred emoticon of the third type corresponding to Level 1 may be displayed last (with a lowest priority).

The positions of the recommended emoticons may be determined based on both the sequence information of the corresponding matching keywords and the specific types for the preferred emoticons. Specifically, a primary position of a recommended emoticon is determined based on sequence information of a corresponding matching keyword, and a secondary position of the recommended emoticon within the primary position may be determined based on a specific type of the preferred emoticon.

In the above example, emoticon A and emoticon B both correspond to "hello", which is the first matching keyword, and the primary position of emoticon A and emoticon B may be determined to be displayed before emoticon C and emoticon D. Here, a secondary position of each of emoticon A and emoticon B may be determined within the primary position based on a specific type.

For example, suppose that emoticon A corresponds to the second type, for which a shortcut path is created by the user, and has Level 2, while emoticon B corresponds to the first type designated as a favorite by the user and has Level 3. In this situation, the emoticon B may be displayed (with a higher priority) prior to the emoticon A in the above-described primary position. As a result, in the above example, the positions may be determined in the following order: emoticon B, emoticon A, emoticon C, and emoticon D.

Figure 3:
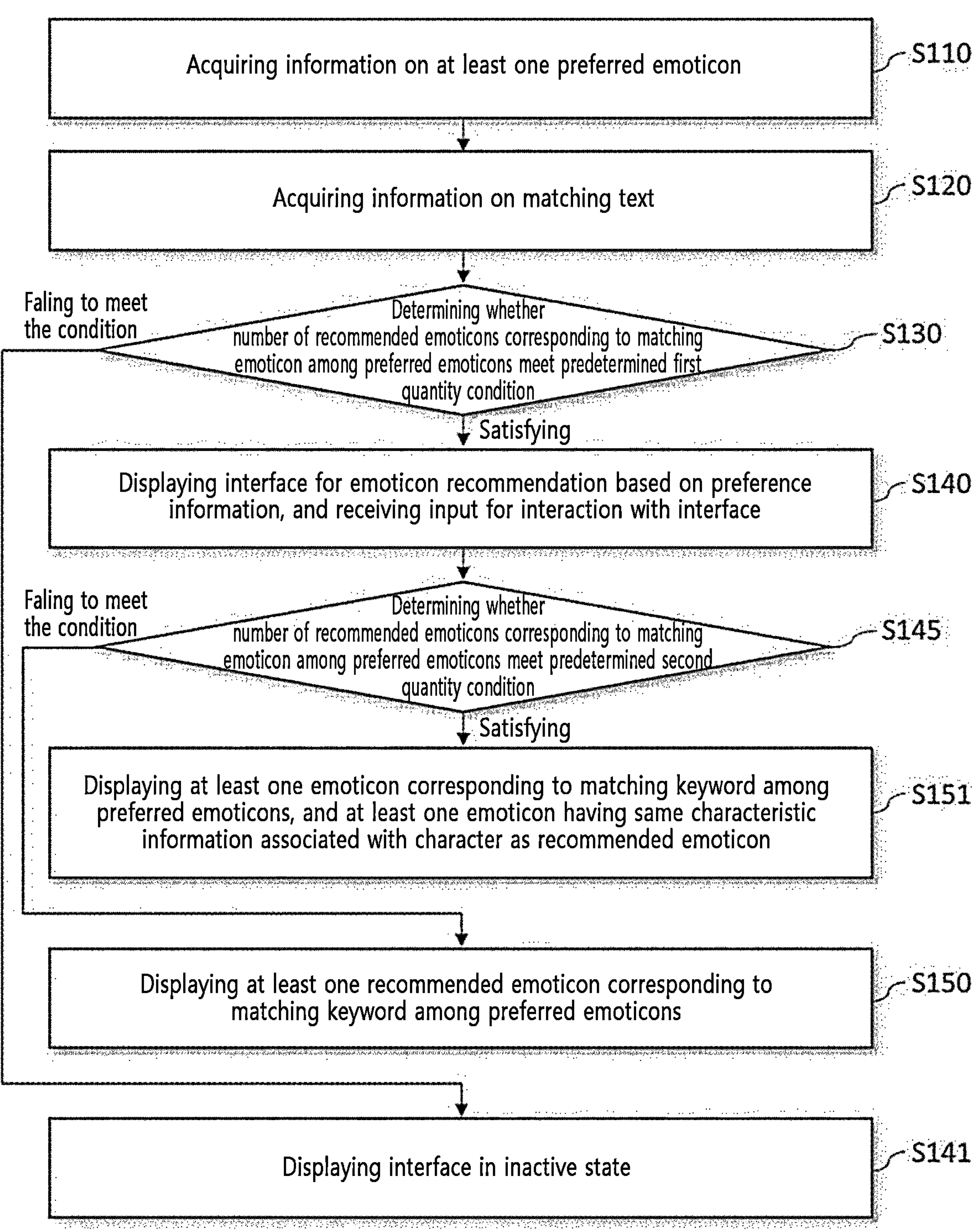
FIG. 3 is a flowchart of operations of a user terminal according to another embodiment of the present disclosure.

FIG. 3 is a flowchart of the operation of the user terminal 20 according to another embodiment of the present disclosure.

In describing a method for recommending emoticons based on a user's emoticon preference information with reference to FIG. 3, the focus should be on highlighting the differences from the method described with reference to FIGS. 1 and 2.

The main feature of the embodiment described in FIG. 3 is that operations S145 and S151 are added, compared to the embodiment described in FIG. 2. Other operations in the embodiment described in FIG. 3 are substantially similar to those in the embodiment described in FIG. 2.

In operation S145, the user terminal 20 determines whether the number of recommended emoticons satisfies a predetermined second quantity condition.

The second quantity condition in operation S145 and the first quantity condition in operation S130 as described above with reference to FIG. 2 share the same subject of assessment, but have different specific conditions.

Specifically, the first quantity condition in operation S130 is used to determine whether to provide emoticon recommendations based on preference information, and may be a minimum quantity requirement for recommendations. For example, the first quantity condition in operation S130 may be one or more. That is, in operation S130, it is determined whether there is any recommended emoticon satisfying the first quantity condition.

However, the second quantity condition in operation S145 is used to determine whether to display extended emoticons by expanding a range of recommended emoticons. Therefore, the second quantity condition may pertain to whether there are remaining emoticons, without exceeding a maximum number of emoticons that doesn't go beyond a limiting condition. Here, the limiting condition may be determined in consideration of a region where emoticons are displayed and a data throughput that the user terminal 20 or the server 10 can handle smoothly. For example, the maximum number of emoticons may be 112, and the second quantity condition in operation S145 may be that the number of recommended emoticons is fewer than 112.

If the number of recommended emoticons is fewer than the maximum number, the second quantity condition is satisfied in operation S145 and operation S151 is performed subsequently. However, if the number of recommended emoticons is greater than or equal to the maximum number, the second quantity condition in operation S145 is not satisfied, and then operation S150 described in FIG. 2 is performed instead of operation S151.

In operation S151, the user terminal 20 displays recommended emoticons and extended emoticons.

Here, a recommended emoticon refers to an emoticon corresponding to a matching keyword among preferred emoticons as described above.

an extended emoticon refers to an emoticon having characteristic information satisfying the same or similar criterion as characteristic information associated with a character of the recommended emoticon. Satisfying the same or similar criterion as the characteristic information associated with the character may indicate that emoticons are based on the same character or intellectual property (IP), associated with the same content series, or created by the same person.

As such, by recommending extended emoticons to a user along with recommended emoticons, the user can have a wider range of choices while his or her preference information is taken into account.

Among the recommended emoticons and the extended emoticons, the recommended emoticons may be displayed with a higher priority than the extended emoticons. Thus, in the user terminal 20, the recommended emoticons may be displayed after the extended emoticons.

For the extended emoticons extended based on the same recommended emoticon, positions thereof may be determined based on sequence information of matching keywords corresponding to the recommended emoticons, which serves as the basis for the extension. For example, an extended emoticon extended based on a recommended emoticon corresponding to a first matching keyword may be displayed with a higher priority than an extended emoticon extended based on a recommended emoticon corresponding to a second matching keyword.

For extended emoticons extended based on the same recommended emoticon, positions thereof may be determined based on release date information. That is, among extended emoticons extended based on the same recommended emoticon, an emoticon that has been recently released may be displayed with a higher priority.

The number of extended emoticons to be added may be limited. Specifically, extended emoticons may be extended within a limited range that ensures the combined number of recommended emoticons and extended emoticons does not exceed the aforementioned maximum number of emoticons.

Hereinafter, specific embodiments of a method in which the user terminal 20 for recommend emoticons based on a user's emoticon preference information will be described with reference to FIGS. 4 to 9.

FIG. 4 is a table illustrating preferred emoticons in a method for recommending emoticons based on a user's emoticon preference information according to the present disclosure.

Referring to FIG. 4, the server 10 or the user terminal 20 may designate an emoticon or emoticon set satisfying a predetermined preference criterion as a preferred emoticon according to emoticon preference information.

A preferred emoticon may be stored as unique emoticon identification information (ID) in the server 10 or the user terminal 20. For convenience of explanation, in this specification, it is assumed that information on a matching keyword corresponding to an emoticon is taken into consideration in emoticon ID. For example, emoticons having IDs such as A1, A2, and A3 may be emoticons corresponding to a matching keyword corresponding to A. However, these emoticon IDs are used for convenience of explanation, and emoticon IDs of the present disclosure are not limited thereto.

Preferred emoticons may be divided and stored by specific types. Specifically, as shown in FIG. 4, preferred emoticons may be categorized into a first type (favorite), a second type (shortcut path), and a third type (recently sent item).

A preferred emoticon may be an individual emoticon or an emoticon set (group) including at least one emoticon. In the example of FIG. 4, one of the emoticons categorized as the second type is an emoticon set SET03. The emoticon set SET03 includes four emoticons C7, E4, G5, and K2.

Also, one preferred emoticon may be stored redundantly as two different types. In the example of FIG. 4, an emoticon D5 is redundantly stored in the first type and the third type.

FIG. 5 is a table illustrating matching keywords and corresponding recommended emoticons in a method for recommending emoticons based on a user's emoticon preference information according to the present disclosure.

FIG. 5 illustrates an example in which recommended emoticons are identified based on the preferred emoticon information of FIG. 4 when the user terminal 20 acquires a matching text "Christmas."

Referring to FIG. 5, the user terminal 20 acquires the matching text "Christmas." The matching text "Christmas" may correspond to four matching keywords "Christmas," "Santa," "Cake," and "Tree."

In the example of FIG. 5, four emoticons A3, A5, A1, and A2 among the preferred emoticons of FIG. 4 correspond to the matching keyword "Christmas." The four emoticons, A3, A5, A1, and A2 are recommended emoticons corresponding to the matching keyword "Christmas."

In addition, three emoticons C9, C7, and C6 among the preferred emoticons of FIG. 4 correspond to the matching keyword "Cake." The three emoticons C9, C7, and C6 are recommended emoticons corresponding to the matching keyword "Cake."

In addition, four emoticons D3, D5, D4, and D2 among the preferred emoticons of FIG. 4 correspond to the matching keyword "Tree." The four emoticons D3, D5, D4, and D2, are recommended emoticons corresponding to the matching keyword "Tree." Here, the emoticon D5 is redundantly stored in both the first type and the third type in FIG. 4. However, when the emoticon D5 is selected as a recommended emoticon, the redundancy is resolved and only one type may be selected.

Also, among the preferred emoticons in FIG. 4, there is no emoticons corresponding to the matching keywords "Santa" and "Carol."

Figure 6:
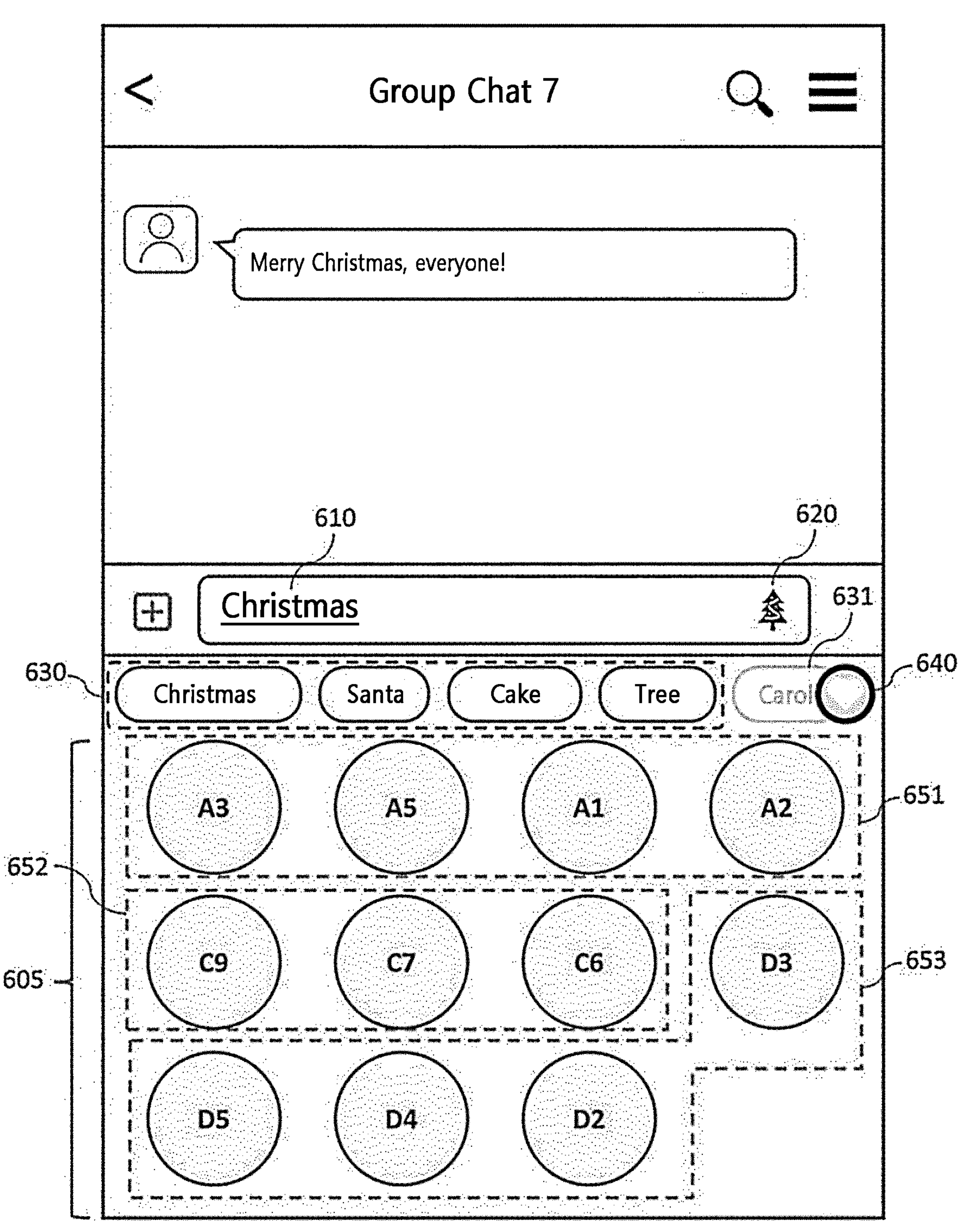
FIG. 6 illustrates an exemplary display screen of a user terminal showing recommended emoticons in a method for recommending emoticons based on a user's emoticon preference information according to an embodiment of the present disclosure.

FIG. 6 illustrates an exemplary screen of the user terminal 20 displaying recommended emoticons in a method for recommending emoticons based on a user's emoticon preference information according to an embodiment of the present disclosure.

FIG. 6 presents an exemplary a screen displaying recommended emoticons based on the preferred emoticon information of FIG. 4 when the user terminal 20 acquires the matching text "Christmas" as in the example of FIG. 5.

Referring to FIG. 6, when the user terminal 20 acquires "Christmas" as a matching text 610, a hint object 620 indicating that the matching text 610 has been input is displayed. When a user's interaction for the hint object 620 is input, emoticon recommendation information based on the matching text 610 may be displayed in a region 605 where a keyboard was previously displayed.

In addition, interfaces 630 and 631 for matching keywords corresponding to the matching text 610 may be displayed. The matching keyword interfaces 630 and 631 correspond to different matching keywords and may each be displayed in an interface form that allows the user to individually select the matching keyword interfaces 630 and 631.

The interface 631 for matching keywords may be partially covered by an interface 640 for emoticon recommendation based on preference information. The covered interface 631 may be displayed, for example, with a blurred appearance to be distinguished from the other interfaces 630.

Although not illustrated in the drawing, the covered interface 631 may shift due to an interaction of moving the interfaces 630 and 631 of the matching keywords, thereby no longer covered by the interface 640. In this case, the interface 631 may be displayed the same as the other interfaces 630.

If the number of recommended emoticons corresponding to the matching keyword among preferred emoticons satisfies a predetermined quantity condition, the interface 640 for emoticon recommendations based on preference information may be displayed. When a user's interaction with the interface 640 is input, recommended emoticons based on preference information are displayed in the region 605 where the keyboard was previously displayed.

With reference to FIGS. 4 to 6, it will be described how to determine the positions of recommended emoticons in a method for recommending emoticons based on a user's emoticon preference information according to an embodiment of the present disclosure.

The positions of recommended emoticons are determined based on sequence information of corresponding matching keywords and specific types for a preferred emoticons.

First, primary positions are determined based on sequence information of matching keywords to which the recommended emoticons correspond.

Referring to FIG. 5, five matching keywords such as "Christmas", "Santa", "Cake", "Tree", and "Carol" may correspond to a matching text "Christmas." In this case, the sequence information of the matching keywords may correspond to "Christmas" in a first position, "Santa" in a second position, "Cake" in a third position, "tree" in a fourth position, and "Carol" in a fifth position.

In this situation, the positions of the recommended emoticons be determined based on the sequence information of the corresponding matching keywords.

Referring to FIG. 6, four recommended emoticons A3, A5, A1, and A2 corresponding to "Christmas" correspond to first sequence information. Thus, a first group 651 including the four recommended emoticons A3, A5, A1, and A2 is displayed first (with a higher priority).

In addition, three recommended emoticons C9, C7, and C6 corresponding to "Cake" correspond to second sequence information. Thus, a second group 652 including the three recommended emoticons C9, C7, and C6 is displayed after the first group 651.

In addition, four recommended emoticons D3, D5, D4, and D2 corresponding to the "Tree" correspond to third sequence information. Thus, a third group 653 including the four recommended emoticons D3, D5, D4, and D2 is displayed after the second group 652 and displayed at the end (with a lower priority).

Here, the positions of the first group 651, the second group 652, and the third group 653 correspond to the primary positions where the recommended emoticons are displayed. In addition, the sequence in which each emoticon is positioned in the first, second, and third groups 651, 652, and 653 corresponds to a secondary position.

Next, secondary positions within the primary positions are determined based on specific types for preferred emoticons of the recommended emoticons.

Referring to FIG. 4, three specific types of preferred emoticons may be categorized into involvement levels based on a user's degree of involvement. Specifically, the involvement level of the first type may be designated as Level 3, the involvement level of the second type may be Level 2, and the involvement level of the third type may be designated as Level 1.

In this case, the positions of the recommended emoticons may be determined depending on the specific types for the corresponding preferred emoticons.

Referring to FIG. 6, among the four recommended emoticons A3, A5, A1, and A2 included in the first group 651, the emoticons A3 and A5 correspond to the first type, and the involvement level thereof corresponds to Level 3. When the emoticon of A3 and A5 corresponds to the same involvement level, it can be said that a more recently designated favorite emoticon has a higher position priority. Assuming that A3 is designated as a preferred emoticon more recently than A5, it can be said that A3 has a higher position priority than A5 within the same level. The emoticon A1 corresponds to the second type, and the involvement level thereof corresponds to Level 2. The emoticon A2 corresponds to the third type, and the involvement level thereof corresponds to Level 1. Therefore, within the first group 651, the emoticons may be displayed in the order of A3, A5, A1, and A2 according to the descending order of involvement levels.

Among the three recommended emoticons C9, C7, and C6 included in the second group 652, the emoticon C9 corresponds to the first type and the involvement level thereof corresponds to Level 3. The emoticon C7 corresponds to the second type, and the involvement level thereof corresponds to Level 2. The emoticon C6 corresponds to the third type, and the involvement level thereof corresponds to Level 1. Therefore, in the second group 652, the emoticons may be displayed in order of C9, C7, and C6 according to the descending order of involvement levels.

Among the four recommended emoticons D3, D5, D4, and D2 included in the third group 653, the emoticons D3 and D5 correspond to the first type and the involvement level thereof corresponds to Level 3. Here, the emoticon of D5 may correspond redundantly to both the first type and the third type. In this case, only the higher involvement level may be assigned, thereby leading to the resolution of redundancy. Assuming that D3 is designated as a preferred emoticon more recently than D5 according to the above criterion, it can be said that D3 has a higher position priority than D5 within the same level. The emoticon D4 corresponds to the second type, and the involvement level thereof corresponds to Level 2. The emoticon D2 corresponds to the third type, and the involvement level thereof corresponds to Level 1. Therefore, in the third group 653, the emoticons may be displayed in the order of D3, D5, D4, and D2 according to the descending order of involvement levels.

Figure 7:
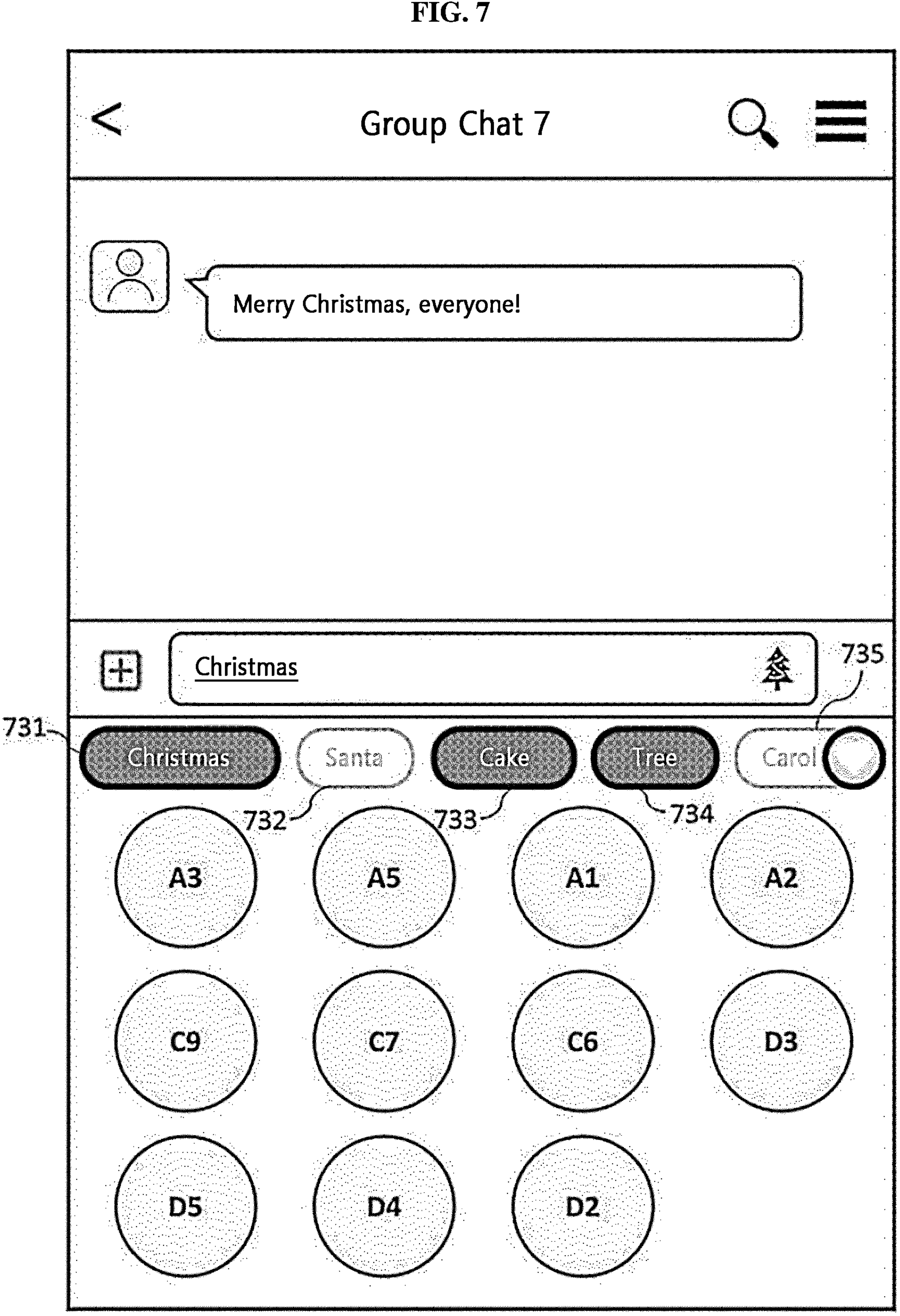
FIG. 7 illustrates an exemplary screen displaying a keyword interface associated with a recommended emoticon in a distinct manner in a method for recommending emoticons based on a user's emoticon preference information according to an embodiment of the present disclosure

FIG. 7 illustrates an exemplary screen displaying a keyword interface associated with a recommended emoticon in a distinct manner in a method for recommending emoticons based on a user's emoticon preference information according to an embodiment of the present disclosure.

In FIG. 6, among the five matching keywords "Christmas," "Santa," "Cake," "Tree," and "Carol," three matching keywords "Christmas," "Cake," and "Tree" correspond to recommended emoticons, while "Santa" and "Carol" do not correspond to any recommended emoticons. Nonetheless, the five matching keywords are displayed in the same way, regardless of whether there is any corresponding recommended emoticon.

On the other hand, FIG. 7 shows an example in which, among the five matching keywords, three matching keywords 731, 733, and 734 of "Christmas", "Cake", and "Tree" correspond to recommended emoticons and are displayed in a distinct form from the other two matching keywords 732 and 735. In FIG. 7, the three matching keywords 731, 733, and 734 are displayed in bold, while the two other matching keywords 732 and 735 are dimly displayed. However, in some cases, it is also possible that the two matching keywords 732 and 735 are not displayed on the screen for differentiation.

In some cases, each of the matching keywords 731 to 735 displayed on the screen may be displayed in the form of an interface which a user can select by inputting an interaction. Accordingly, the user may input an interaction of selecting a matching keyword, so that only recommended emoticons corresponding to the selected matching keyword among multiple recommended emoticons displayed can be selectively displayed. For example, in FIG. 7, when the user selects the interface 733 corresponding to "Cake", only the corresponding emoticons C9, C7, and C6 may be displayed.

Accordingly, there is an advantage in that the user can easily identify and select a matching keyword corresponding to a recommended emoticon currently displayed on the screen.

FIG. 8 is a table illustrating recommended and extended emoticons in a method for recommending emoticons based on a user's emoticon preference information according to an embodiment of the present disclosure.

FIG. 8 illustrates a case where recommended emoticons are identified and extended emoticons are identified in the example of FIG. 5.

Referring to FIG. 8, five emoticons EA1, EA3, EA7, EA8, and EA9 corresponding to the matching keyword "Christmas" are extended emoticons. At least one of the five emoticons EA1, EA3, EA7, EA8, and EA9 has the same characteristic information as characteristic information associated with a character of any of the four emoticons A3, A5, A1, and A2 corresponding to the matching keyword "Christmas."

In this way, four emoticons EC4, EC6, EC7, and EC8 corresponding to the matching keyword "Cake" correspond to extended emoticons, and four emoticons such as ED3, ED4, ED8, and ED9 corresponding to the matching keyword "Tree" correspond to extended emoticons.

Figure 9:
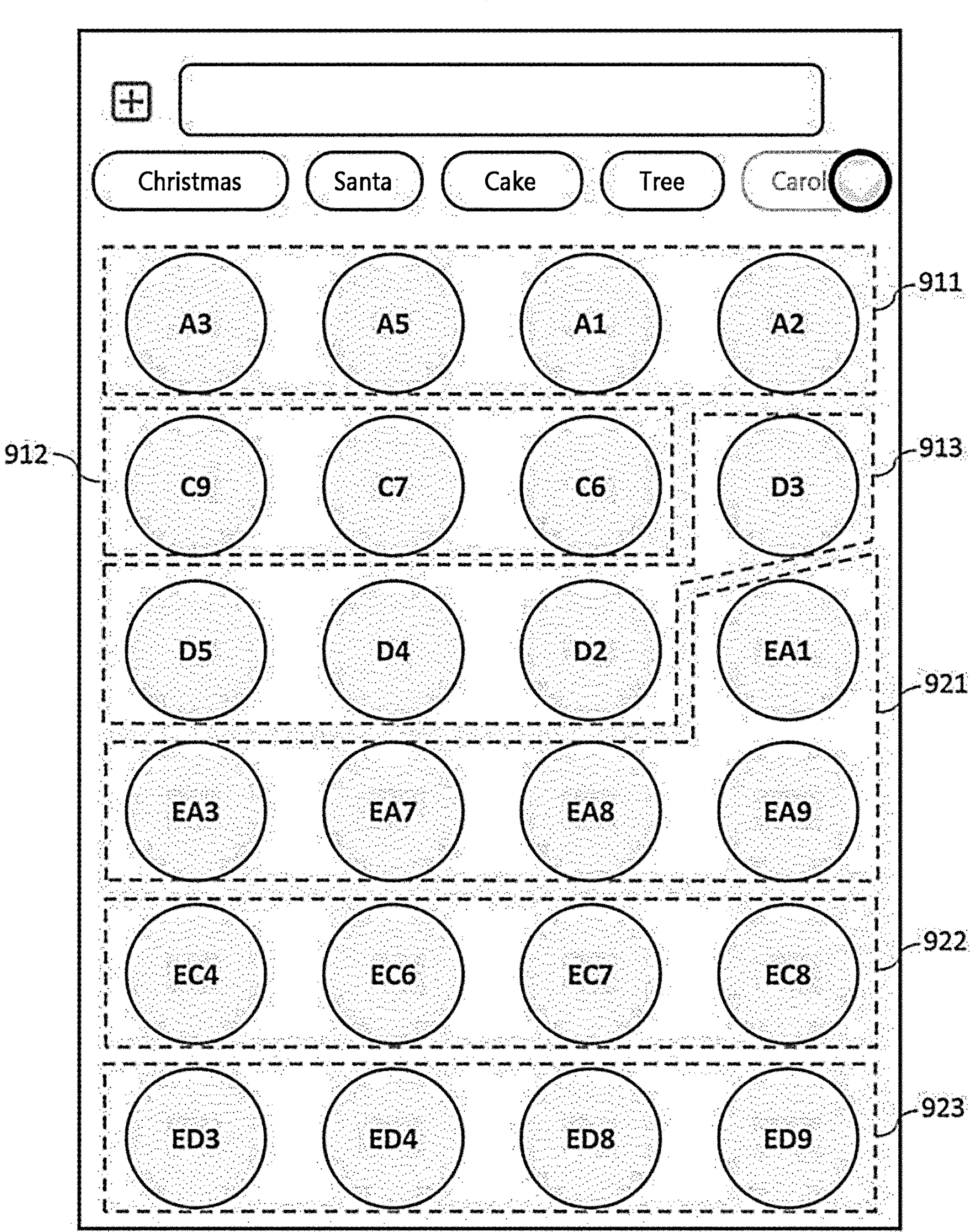
FIG. 9 illustrates an exemplary screen of a user terminal displaying recommended emoticons and extended emoticons in a method for recommending emoticons based on a user's emoticon preference information according to an embodiment of the present disclosure.

FIG. 9 illustrates a screen of the user terminal 20 displaying recommended emoticons and extended emoticons in a method for recommending emoticons based on user's emoticon preference information according to an embodiment of the present disclosure.

Referring to FIG. 9, extended emoticons 921, 922, and 923 are displayed after (with a lower priority) entire recommended emoticons 911, 912, and 913. For the extended emoticons, positions thereof may be determined based on sequence information of matching keywords corresponding to the recommended emoticons that are the basis of extension.

Specifically, extended emoticons included in a first extended group 921 are emoticons extended based on a recommended emoticon corresponding to first sequence information. Thus, the first extended group 921 is displayed before (with a higher priority) the other extended groups 922 and 923.

In addition, extended emoticons included in a second extended group 922 are emoticons extended based on a recommended emoticon corresponding to second sequence information. Thus, a second extended group 922 is displayed after the first extended group 921.

In addition, extended emoticons included in a third extended group 923 are emoticons extended based on a recommended emoticon corresponding to third sequence information. Thus, the third extended group 923 is displayed at the end (with a lower priority) after the second extended group 922.

Figure 10:
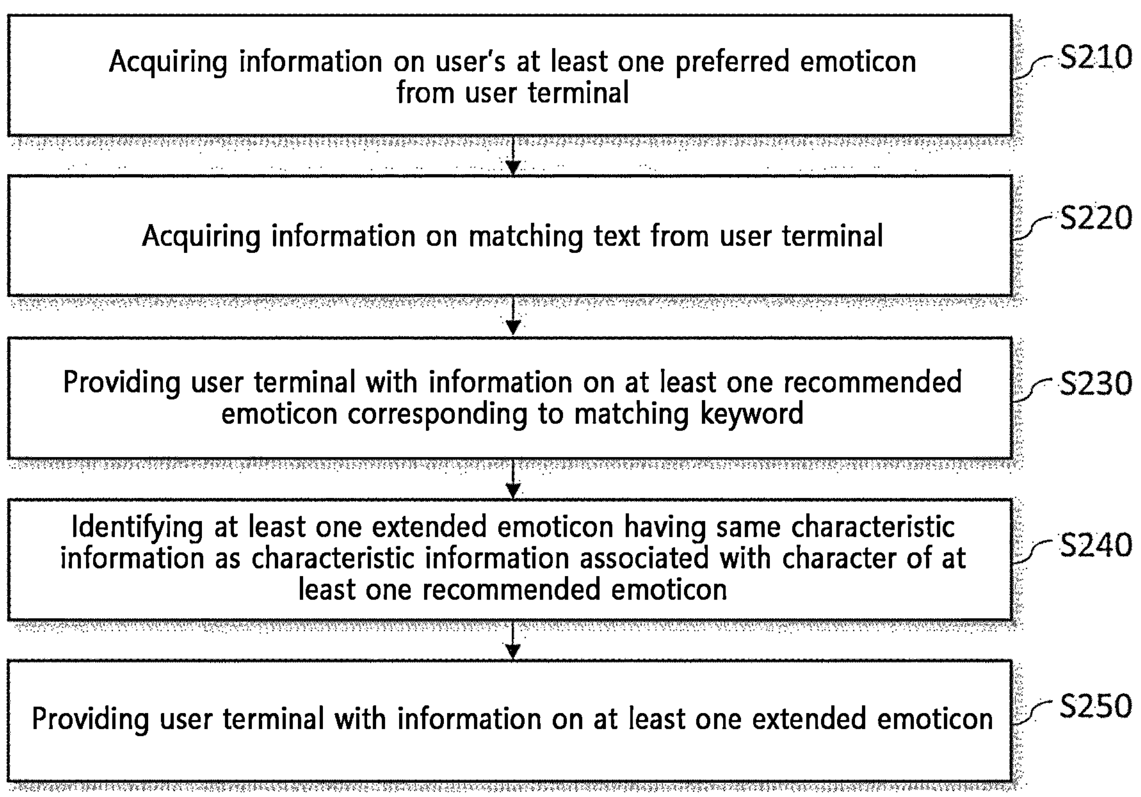
FIG. 10 is a flowchart illustrating a method for a server to recommend emoticons based on a user's emoticon preference information according to an embodiment of the present disclosure.

FIG. 10 is a flowchart illustrating a method for recommending emoticons based on emoticon preference information of a user by the server 10 according to an embodiment of the present disclosure.

Each operation described with reference to FIG. 10 corresponds to each operation performed by the server 10 described above with reference to FIGS. 2 and 3. Thus, a detailed description of each operation of FIG. 10 will be replaced with the above description.

In operation S210, the server 10 acquires information on at least one preferred emoticon of a user from the user terminal 20. This may be an operation corresponding to the above-described operation S110.

In operation S220, the server 10 acquires information on a matching text from the user terminal 20. Here, the matching text corresponds to at least one matching keyword. This may be an operation corresponding to the operation S120 described above.

In operation S230, the server 10 provides the user terminal 20 with information on at least one recommended emoticon corresponding to the at least one matching keyword among the at least one preferred emoticon. This may be an operation corresponding to operation S150 described above.

In operation S240, the server 10 identifies at least one extended emoticon having the same characteristic information as characteristic information associated with a character of the recommended emoticon. In addition, in operation S240, the server 10 provides the user terminal 20 with information on the at least one extended emoticon. This may be an operation corresponding to the operation S151 described above.

The present disclosure has an advantage of providing a method for recommending emoticons based on a user's emoticon preference information.

In addition, when recommending emoticons to a user, the present disclosure has an advantage of providing a method of displaying a recommended emoticon by reflecting the user's preference.

In addition, when recommending emoticons to a user, the present disclosure has an advantage of providing a method for recommending an extended emoticon together based on a character of a preferred emoticon.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method of recommending emoticons in a user terminal based on emoticon preference information of a user, the method comprising:

acquiring, by a processor of the user terminal, information on at least one preferred emoticon, wherein the at least one preferred emoticon is designated through an interaction with an emoticon of the user according to a predefined method and categorized into at least one specific type, including:

a first type designated by the user as a user favorite, wherein the first type designation is based on a first level involvement of user interactions, wherein the first type designation includes a first group of user preferred emoticons selected based on the user favorite and the first level involvement of user interactions, a second type designated by the user, wherein the second type designation is based on a second level involvement of user interactions, wherein the second type designation includes a link created by the user, and wherein the link provides a direct access to a user preferred emoticon and/or an access to a second group of user preferred emoticons, and a third type designated based on one or more time periods when the user used the at least one preferred emoticon, wherein the third type designation is based on a third level involvement of user interactions, and wherein the third type designation includes a third group of user preferred emoticons selected based on the one or more time periods;

acquiring, by the processor, information on a matching text input into a conversation input window of a messenger application executed on the user terminal, wherein the matching text corresponds to at least one matching keyword in a keyword dictionary;

identifying, by the processor, at least one matching keyword corresponding to the matching text by referring to the keyword dictionary stored in a memory of the user terminal;

identifying, by the processor, one or more recommended emoticons from each of the first, second, and third groups of user preferred emoticons based on a correspondence relationship between the at least one preferred emoticon and the at least one matching keyword;

determining, by the processor, positions of the one or more recommended emoticons of each of the first, second, and third groups of user preferred emoticons based on sequence information of the at least one matching keyword and the at least one specific type associated with the at least one preferred emoticon;

displaying, by the processor, the one or more recommended emoticons of each of the first, second, and third groups of user preferred emoticons according to the determined positions; and displaying, by the processor, a matching keyword corresponding to the one or more recommended emoticons of each of the first, second, and third groups of user preferred emoticons, among the at least one matching keyword, in a form distinct from other matching keywords.

2. The method of claim 1, wherein:

each of the at least one matching keyword corresponds to sequence information different from sequence information of other matching keywords, at least one of the positions of the at least one recommended emoticon comprising: a primary position determined based on the sequence information of the at least one corresponding matching keyword, and a secondary position within the primary position determined based on the at least one specific type.

3. The method of claim 1, further comprising:

determining whether a number of the at least one recommended emoticon satisfies a predetermined first quantity condition, wherein the displaying is performed only when the number of recommended emoticons satisfies the first quantity condition.

4. The method of claim 1, further comprising:

prior to the displaying, displaying an interface associated with an emoticon recommendation based on the preference information and receiving an interaction with the interface.

5. The method of claim 4, wherein the receiving is performed only when a number of the at least one recommended emoticon satisfies a predetermined first quantity condition.

6. The method of claim 1, wherein in displaying the at least one recommended emoticon, at least one extended emoticon having same characteristic information as characteristic information associated with a character of the at least one recommended emoticon is further displayed.

7. The method of claim 6, wherein the at least one recommended emoticon is displayed with a higher priority than the at least one extended emoticon.

8. The method of claim 6, wherein a position of the at least one extended emoticon is determined based on release date information.

9. The method of claim 6, wherein whether to display the at least one extended emoticon is determined depending on whether a number of the at least one recommended emoticon satisfies a predetermined second quantity condition.

10. A user terminal for recommending emoticons based on emoticon preference information of a user, the user terminal comprising:

a memory storing instructions; and a processor in data communication with the memory and configured to execute instructions to:

acquire information on at least one preferred emoticon, wherein the at least one preferred emoticon is designated through an interaction of the user with an emoticon according to a predefined method and categorized into at least one specific type, including:

a first type designated by the user as a user favorite, wherein the first type designation is based on a first level involvement of user interactions, wherein the first type designation includes a first group of user preferred emoticons selected based on the user favorite and the first level involvement of user interactions, a second type designated by the user, wherein the second type designation is based on a second level involvement of user interactions, wherein the second type designation includes a link created by the user, and wherein the link provides a direct access to a user preferred emoticon and/or an access to a second group of user preferred emoticons, and a third type designated based on one or more time periods when the user used the at least one preferred emoticon, wherein the third type designation is based on a third level involvement of user interactions, and wherein the third type designation includes a third group of user preferred emoticons selected based on the one or more time periods;

acquire information on a matching text input into a conversation input window of a messenger application executed on the user terminal, wherein the matching text corresponds to at least one matching keyword in a keyword dictionary;

identify at least one matching keyword corresponding to the matching text by referring to the keyword dictionary stored in a memory of the user terminal;

identify one or more recommended emoticons from each of the first, second, and third groups of user preferred emoticons among the at least one preferred emoticon based on a correspondence relationship between the at least one preferred emoticon and the at least one matching keyword;

determine positions of the one or more recommended emoticons of each of the first, second, and third groups of user preferred emoticons based on sequence information of the at least one matching keyword and the at least one specific type associated with the at least one preferred emoticon;

display the one or more recommended emoticons of each of the first, second, and third groups of user preferred emoticons according to the determined positions; and display a matching keyword corresponding to the one or more recommended emoticons of each of the first, second, and third groups of user preferred emoticons, among the at least one matching keyword, in a form distinct from other matching keywords.

11. A method of recommending emoticons in a server based on emoticon preference information of a user, the method comprising:

acquiring, by a processor of the server, information on at least one preferred emoticon of the user from a user terminal, wherein the at least one preferred emoticon is designated by an interaction of the user with the emoticon according to a predefined method and categorized into at least one specific type, including:

a first type designated by the user as a user favorite, wherein the first type designation is based on a first level involvement of user interactions wherein the first type designation includes a first group of user preferred emoticons selected based on the user favorite and the first level involvement of user interactions, a second type designated by the user, wherein the second type designation is based on a second level involvement of user interactions, wherein the second type designation includes a link created by the user, and wherein the link provides a direct access to a user preferred emoticon and/or an access to a second group of user preferred emoticons, and a third type designated based on one or more time periods when the user used the at least one preferred emoticon, wherein the third type designation is based on a third level involvement of user interactions, and wherein the third type designation includes a third group of user preferred emoticons selected based on the one or more time periods;

acquiring, by the processor, information on a matching text input into a conversation input window from the user terminal, wherein the matching text corresponds to at least one matching keyword in a keyword dictionary stored in a memory of the user terminal; and causing, by the processor, the user terminal to:

identify at least one matching keyword corresponding to the matching text by referring to the keyword dictionary, identify one or more recommended emoticons from each of the first, second, and third groups of user preferred emoticons among the at least one preferred emoticon based on a correspondence relationship between the at least one preferred emoticon and the at least one matching keyword, determine positions of the one or more recommended emoticons of each of the first, second, and third groups of user preferred emoticons based on sequence information of the at least one matching keyword and the at least one specific type associated with the at least one preferred emoticon, display the one or more recommended emoticons of each of the first, second, and third groups of user preferred emoticons according to the determined positions, and display a matching keyword corresponding to the one or more recommended emoticons of each of the first, second, and third groups of user preferred emoticons, among the at least one matching keyword, in a form distinct from other matching keywords.

12. The method of claim 11, further comprising:

identifying at least one extended emoticon having same characteristic information as characteristic information associated with a character of the at least one recommended emoticon; and providing the user terminal with information on the at least one extended emoticon.

* * * * *